(12) United States Patent
Dunsby

(10) Patent No.: US 12,345,867 B2
(45) Date of Patent: Jul. 1, 2025

(54) OBLIQUE PLANE MICROSCOPY

(71) Applicant: IMPERIAL COLLEGE INNOVATIONS LIMITED, London (GB)

(72) Inventor: Christopher William Dunsby, London (GB)

(73) Assignee: IMPERIAL COLLEGE INNOVATIONS LIMITED, London (GB)

(*) Notice: Subject to any disclaimer, the term of this patent is extended or adjusted under 35 U.S.C. 154(b) by 240 days.

(21) Appl. No.: 17/641,772

(22) PCT Filed: Sep. 21, 2020

(86) PCT No.: PCT/GB2020/052279
§ 371 (c)(1),
(2) Date: Mar. 9, 2022

(87) PCT Pub. No.: WO2021/058939
PCT Pub. Date: Apr. 1, 2021

(65) Prior Publication Data
US 2024/0045195 A1 Feb. 8, 2024

(30) Foreign Application Priority Data
Sep. 23, 2019 (GB) .................................... 1913703

(51) Int. Cl.
*G02B 21/00* (2006.01)
*G02B 21/36* (2006.01)
*G02B 21/06* (2006.01)

(52) U.S. Cl.
CPC ......... *G02B 21/361* (2013.01); *G02B 21/006* (2013.01); *G02B 21/0076* (2013.01); *G02B 21/0032* (2013.01); *G02B 21/06* (2013.01)

(58) Field of Classification Search
CPC ............... G02B 21/361; G02B 21/006; G02B 21/0076; G02B 21/0032; G02B 21/06; G02B 21/16; G02B 21/18; G02B 21/367
See application file for complete search history.

(56) References Cited

U.S. PATENT DOCUMENTS 10,061,111 B2    8/2018  Hillman
2007/0051869 A1*  3/2007  Knebel ............... G02B 21/0032
                                               250/201.3
(Continued)

FOREIGN PATENT DOCUMENTS

WO    2010/012980    2/2010
WO    2017/210159    12/2017

OTHER PUBLICATIONS

Bouchard et al., "Swept confocally-aligned planar excitation (SCAPE) microscopy for high-speed volumetric imaging of behaving organisms," Nature Photonics, vol. 9: 113-119 (Feb. 2015).

(Continued)

*Primary Examiner* — Mustak Choudhury
(74) *Attorney, Agent, or Firm* — Barnes & Thornburg LLP

(57) ABSTRACT

An optical arrangement for oblique plane microscopy, comprising: an illumination generator arranged to provide a beam of illumination through a first objective lens to illuminate or excite an oblique plane of a sample in use, wherein the first objective lens is also arranged to receive a beam of emitted light from the oblique plane of the sample in use; first and second relay lenses and a second objective lens sequentially arranged to receive the beam of emitted light from the first objective lens and to form, at the focal plane of the second objective lens, an intermediate image having a tilted plane conjugate to that of the oblique plane of the sample; a first mirror located at said focal plane of the (Continued)

second objective lens, arranged to receive and reflect the beam of emitted light; a third relay lens; and an image detector; wherein the second objective lens and the third relay lens are arranged to relay the intermediate image from the first mirror to the image detector; wherein the first mirror is also arranged to receive the beam of illumination from the illumination generator and to reflect the beam of illumination through the second objective lens; and wherein the optical arrangement further comprises a beam splitter disposed between the second objective lens and the second relay lens, the beam splitter being configured to: (i) direct the beam of illumination from the second objective lens to the second relay lens, and thence to the first relay lens, the first objective lens and the sample; (ii) direct the beam of emitted light from the second relay lens to the second objective lens, and thence to the first mirror; and (iii) direct the reflected beam of emitted light from the second objective lens to the third relay lens and thence to the image detector. Also provided is a corresponding method of performing oblique plane microscopy.

21 Claims, 16 Drawing Sheets

(56) References Cited

U.S. PATENT DOCUMENTS

| | | | |
|---|---|---|---|
| 2009/0046298 A1* | 2/2009 | Betzig | G01N 21/6458 356/450 |
| 2011/0075255 A1* | 3/2011 | Kennedy | G02B 21/02 359/385 |
| 2011/0261446 A1* | 10/2011 | Dunsby | G02B 21/16 359/380 |
| 2014/0153081 A1* | 6/2014 | Kirkby | G02F 1/0072 359/310 |
| 2015/0192767 A1 | 7/2015 | Li et al. | |
| 2015/0226677 A1 | 8/2015 | Sullivan et al. | |
| 2016/0305883 A1* | 10/2016 | Betzig | G02B 21/16 |
| 2018/0173004 A1* | 6/2018 | Nikolenko | G01N 21/6458 |
| 2019/0196172 A1* | 6/2019 | Hillman | G02B 21/0052 |
| 2019/0265454 A1* | 8/2019 | Kalkbrenner | G02B 21/32 |
| 2019/0324244 A1* | 10/2019 | Kozorovitskiy | G02B 21/367 |

OTHER PUBLICATIONS

Dunsby, "Optically sections imaging by oblique plane microscopy." Optics Express 16.25: 20306-20316 (2008).

Kim et al. "Oblique-plane single-molecule localization microscopy for tissues and small intact animals." Nature Methods, 16.9: 853-857 (2019).

Kumar et al. "High-speed 2D and 3D fluorescence microscopy of cardiac myocytes," Optics Express, 19.15: 13839-13847 (2011).

Search Report issued in Appl. No. GB1913703.3 (2020).

Search Report & Written Opinion issued in Int'l Appl. No. PCT/GB2020/052279 (2021).

* cited by examiner (Prior Art – based on WO 2010/012980 A1)

(Prior Art – based on "SCAPE")

OBLIQUE PLANE MICROSCOPY

CROSS-REFERENCE TO RELATED APPLICATIONS

This application is a nationalization under 35 USC § 371 of PCT Application No. PCT/GB2020/052279, filed on Sep. 21, 2020, which claims priority from United Kingdom Application No. GB 1913703.3, filed on Sep. 23, 2019, the entirety of which are each fully incorporated by reference herein.

FIELD OF THE INVENTION

This invention relates to optical microscopy, and in particular to an optical arrangement for selective illumination and microscopic imaging of an oblique plane within a specimen.

BACKGROUND TO THE INVENTION

Light sheet fluorescence microscopy (LSFM) employs an illumination optical system to produce a thin sheet of laser illumination to excite fluorescence from a thin plane within the specimen. Fluorescence is then collected using a second detection optical system aligned to image the plane that is illuminated.

LSFM has the advantage that it causes minimal photobleaching (light induced destruction of fluorophores) and phototoxicity (light induced killing of the sample) away from the plane that is currently being imaged. It also has the advantage that—in its simplest form—it requires no moving parts or image processing to acquire an optically sectioned image; this makes it able to acquire optically sectioned images at high frame rates that are only limited by the frame rate of the camera employed.

Conventional LSFM employs two microscope objectives oriented at 90° with respect to one another. The first is used to provide the light sheet illumination and the second is used to collect the resulting fluorescence. The requirement to use two microscope objectives that are placed close to the sample complicates the sample preparation and mounting and makes it harder to use conventional sample mounting methods such as microscope coverslips and multiwell plates.

As described by the present inventor in WO 2010/012980 A1 and [1], and as illustrated in the present FIG. 1a, oblique plane microscopy (OPM) uses a high numerical aperture microscope objective to provide both illumination and detection for LSFM. The high numerical aperture objective (O1) is used to provide an illumination sheet that is tilted with respect to the optical axis, and correction optics (TL2, O2, O3, TL3) placed after the first microscope (O1 and TL1) are used to tilt the detection plane so that it co-aligns with the illuminated plane. The correction optics are achieved by placing a second microscope (TL2 and O2) at the output of the first microscope (O1 and TL1) in order to produce an intermediate image that is close to the actual size of the sample. Together, the first and second microscopes are designed to ensure that the lateral and axial magnifications are equal in the intermediate image and therefore that the intermediate image is not distorted (stretched) compared to the object. A tilted plane in the intermediate image—conjugate to that of the illumination plane—can then be imaged onto a camera by using a third microscope (O3 and TL3) placed at an angle to the optical axis of the first two microscopes.

As well as achieving LSFM with a single microscope objective for illumination and collection of fluorescence from the sample, OPM also enables rapid remote scanning of the plane being imaged, thus enabling high speed volumetric (3D) imaging. This remote scanning has been achieved by adjusting the axial position of the remote objective O2 [2]. It is also possible to introduce additional optics to an OPM system to provide lateral scanning of the light sheet in a method called swept confocally-aligned planar excitation (SCAPE) microscopy [3], as illustrated in the present FIG. 1b and described in U.S. Pat. No. 10,061,111 B2.

Both pre-existing OPM and SCAPE require quite a long physical optical path in order to accommodate the three microscopes placed one after the other. In addition, both OPM and SCAPE require the remote objectives (O2 and O3) to have high numerical apertures and be able to be placed at a significant angle (typically 35-45°) to one another. This condition can be difficult to achieve as their focal planes of O2 and O3 must also intersect at the point of intersection of their respective optical axes.

There is a desire to improve the optical configuration in OPM, including making the arrangement of the beam paths more compact.

There is also a desire to be able to implement scanning in OPM, to enable 3D imaging, in an efficient and reliable manner that does not involve adjusting the axial position of the remote objective O2.

SUMMARY OF THE INVENTION

The present invention provides a new (so-called "folded") OPM configuration that enables a more compact arrangement of the beam paths to be achieved, whilst also enabling scanning of the illumination sheet and field of view.

According to a first aspect of the present invention there is proved an optical arrangement as defined in claim 1 of the appended claims. Thus there is provided an optical arrangement for oblique plane microscopy, comprising: an illumination generator arranged to provide a beam of illumination through a first objective lens to illuminate or excite an oblique plane of a sample in use, wherein the first objective lens is also arranged to receive a beam of emitted light from the oblique plane of the sample in use; first and second relay lenses and a second objective lens sequentially arranged to receive the beam of emitted light from the first objective lens and to form, at the focal plane of the second objective lens, an intermediate image having a tilted plane conjugate to that of the oblique plane of the sample; a first mirror located at said focal plane of the second objective lens, arranged to receive and reflect the beam of emitted light; a third relay lens; and an image detector; wherein the second objective lens and the third relay lens are arranged to relay the intermediate image from the first mirror to the image detector; wherein the first mirror is also arranged to receive the beam of illumination from the illumination generator and to reflect the beam of illumination through the second objective lens; and wherein the optical arrangement further comprises a beam splitter disposed between the second objective lens and the second relay lens, the beam splitter being configured to: (i) direct the beam of illumination from the second objective lens to the second relay lens, and thence to the first relay lens, the first objective lens and the sample; (ii) direct the beam of emitted light from the second relay lens to the second objective lens, and thence to the first mirror; and (iii)

direct the reflected beam of emitted light from the second objective lens to the third relay lens and thence to the image detector.

As a consequence of the first mirror being arranged to receive the beam of illumination from the illumination generator and to reflect the beam of illumination through the second objective lens, as well as the first mirror reflecting the emitted light from the sample, and by virtue of the operation of the abovementioned beam splitter, this provides an improved OPM configuration in which the arrangement of the beam paths is more compact. Moreover, by essentially reusing the second objective lens (which has a high numerical aperture) for both the emission and illumination beams, the optical arrangement is not constrained by needing to situate two separate objective lenses (O2 and O3 in FIGS. 1a and 1b) close to one another.

Preferably the first mirror is a translatable mirror, operable to cause the plane of imaging to be scanned through the sample in use. This advantageously enables 3D imaging to be carried out in an efficient and reliable manner that does not involve adjusting the axial position of the remote objective. Rather, using the present technique, scanning can be achieved by moving the first mirror in any direction that has a component parallel to the mirror normal. Such translation of the first mirror can be performed rapidly, not least since a single mirror is very light in weight in comparison to an objective lens. Further benefits of scanning by translating the first mirror—including that the illumination beam can be scanned across the sample in synchrony with the scanned detection plane—are set out below.

The beam splitter may comprise a non-polarising beam splitter. Preferably, though, the beam splitter may comprise a polarising beam splitter together with a quarter-wave plate, to increase the optical throughput compared to a non-polarising beam splitter.

A half-wave plate and/or quarter-wave plate (or alternative retarder or retarder combination) may also be provided between the illumination generator and the first mirror, to adjust the polarisation state of the illumination light to maximise its reflection from the beam splitter used, and thereby maximise throughput to the sample.

Optionally a second mirror may be provided in the illumination beam path, closely before the first mirror, so as to avoid clipping of the illumination beam, e.g. by the front face of the second objective lens, so as to increase the numerical aperture of the illumination beam and to decrease the achievable illumination sheet waist size in use.

In certain embodiments the beam splitter may be configured such that the beam of emitted light is reflected through the beam splitter on its path to the first mirror.

In other embodiments the beam splitter may be configured such that the beam of emitted light is transmitted through the beam splitter on its path to the first mirror.

Advantageously the first mirror may be rotatable about the optical axis of the second objective lens, thereby enabling the angle of the oblique plane of imaging to be rotated.

For example, the optical arrangement may further comprise a rotatable optical subassembly which includes the first mirror. The components of the rotatable optical subassembly may be mounted on a common rotatable stage, to facilitate rotation.

Alternatively, or in addition, the illumination may be provided by the illumination generator via an optical fibre. An optical fibre rotating coupler may be disposed between the optical fibre and the first mirror, to enable the mirror to be rotated without undesirable twisting of the optical fibre.

In certain embodiments the first mirror may be rotatable to enable the selection of one of two illumination beam paths. Alternatively, the first mirror may be one of two mirrors orientated in different directions, the said two mirrors being translatable with at least a component of their motion being perpendicular to the optical axis of the second objective lens. The said two mirrors may or may not be commonly mounted.

Optionally the optical arrangement may further comprise a bulk optical circulator, to increase the optical collection efficiency. The optical circulator may include a half-wave plate placed so as to only act on the illumination beam.

To minimise vibrations during rapid translation of the first mirror, the first mirror may be coupled to a compensating mass, the compensating mass having the same mass as the first mirror, and arranged to oscillate in antiphase with the first mirror and with the same amplitude as the first mirror. For example, the first mirror and compensating mass may form part of a flexure stage, the flexure stage also having an actuator operable to drive the first mirror and the compensating mass.

Optionally the optical arrangement may further comprise means for generating an activation beam to cause photoactivation and/or photoconversion in a portion of the sample. The activation beam may be arranged to pass through the second objective lens and be reflected by the first mirror back through the second objective lens and thence along the path taken by the emitted light from the sample to the second objective lens in reverse.

According to a second aspect of the present invention there is proved a method of performing oblique plane microscopy comprising: providing a beam of illumination through a first objective lens to illuminate or excite an oblique plane of a sample, wherein the first objective lens is also arranged to receive a beam of emitted light from the oblique plane of the sample; sequentially using first and second relay lenses and a second objective lens to receive the beam of emitted light from the first objective lens and to form, at the focal plane of the second objective lens, an intermediate image having a tilted plane conjugate to that of the oblique plane of the sample; using a first mirror located at said focal plane of the second objective lens to receive and reflect the beam of emitted light; and relaying the intermediate image from the first mirror to the image detector using the second objective lens and a third relay lens; wherein the first mirror also receives the beam of illumination from the illumination generator and reflects the beam of illumination through the second objective lens; and wherein the method further comprises using a beam splitter disposed between the second objective lens and the second relay lens to: (i) direct the beam of illumination from the second objective lens to the second relay lens, and thence to the first relay lens, the first objective lens and the sample; (ii) direct the beam of emitted light from the second relay lens to the second objective lens, and thence to the first mirror; and (iii) direct the reflected beam of emitted light from the second objective lens to the third relay lens and thence to the image detector.

The present disclosure also provides an optical arrangement for oblique plane microscopy, comprising a bulk optical circulator.

The present disclosure also provides a flexure stage for use in microscopy or spectrometry, the flexure stage comprising: a translatable mirror coupled to a compensating mass, the compensating mass having the same mass as the mirror, and arranged to oscillate in antiphase with the mirror and with the same amplitude as the mirror; and an actuator operable to drive the mirror and the compensating mass.

The present disclosure also provides an optical arrangement for oblique plane microscopy, comprising means for generating an activation beam to cause photoactivation and/or photoconversion in a portion of the sample, wherein the activation beam is arranged to pass in a reverse direction along at least part of the path taken by the emitted light from the sample.

BRIEF DESCRIPTION OF THE DRAWINGS

Embodiments of the invention will now be described, by way of example only, and with reference to the drawings in which.

In the figures, like elements are indicated by like reference signs throughout.

DETAILED DESCRIPTION OF PREFERRED EMBODIMENTS

The present embodiments represent the best ways known to the Applicant of putting the invention into practice. However, they are not the only ways in which this can be achieved.

Overview

The present work provides an improved implementation of oblique plane microscopy (OPM) from that of WO 2010/012980 A1, where the beam path of the emitted light (fluorescence from the sample) is now "folded" about a mirror placed at the focal plane of the second OPM microscope objective, O2. If desired, scanning of the imaged plane can be achieved by translating the fold mirror. Advantageously, the illumination light is coupled in via this mirror so that the illumination beam can be scanned across the sample in synchrony with the scanned detection plane. Amongst other things, this approach has the following benefits:

1) The only moving component is a small scanning mirror that can be lightweight and therefore can be scanned rapidly, e.g. for the purpose of 3D imaging.
2) It is relatively straightforward to acquire two views of the sample from orthogonal directions that can then be fused together in software to produce a near-isotropic spatial resolution. This is particularly important when performing quantitative analyses of cell morphology as non-isotropic resolution leads to many unwanted sources of bias.
3) Compact geometry that makes the setup easier to productise.
4) Increased fluorescence collection efficiency compared to the pre-existing OPM.

Details of a First Embodiment of a "Folded" OPM Configuration

Figure 1A:
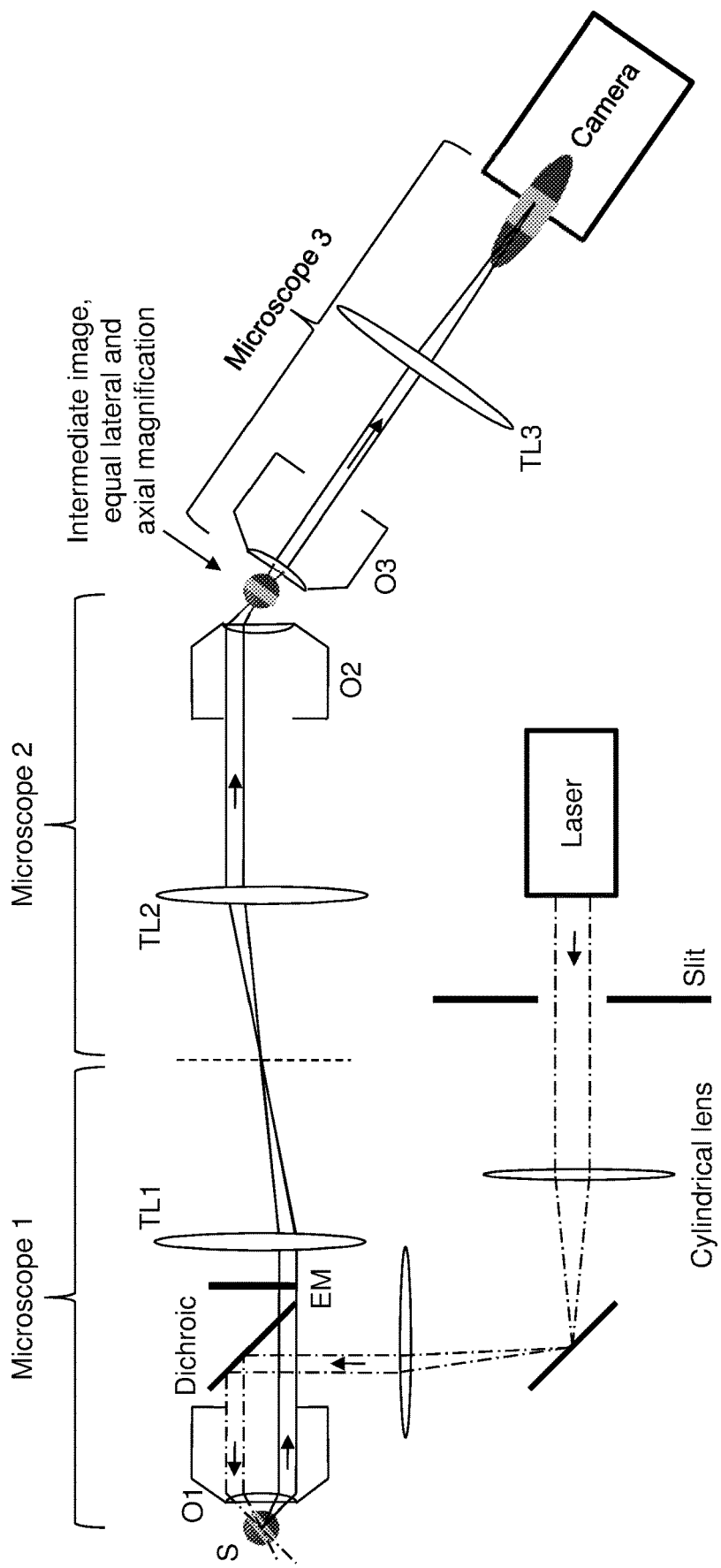
FIG. 1a illustrates an exemplary pre-existing OPM setup (as per WO 2010/012980 A1)
Figure 1B:
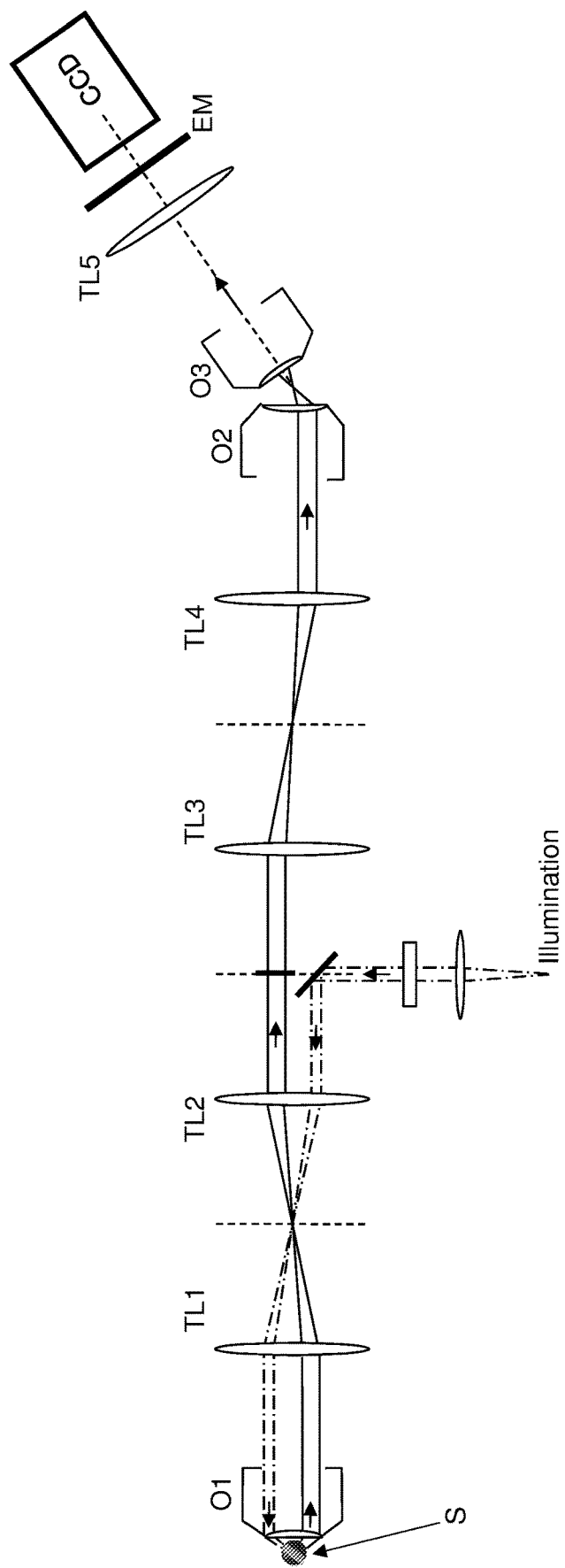
FIG. 1b illustrates an exemplary pre-existing SCAPE setup.
Figure 2:
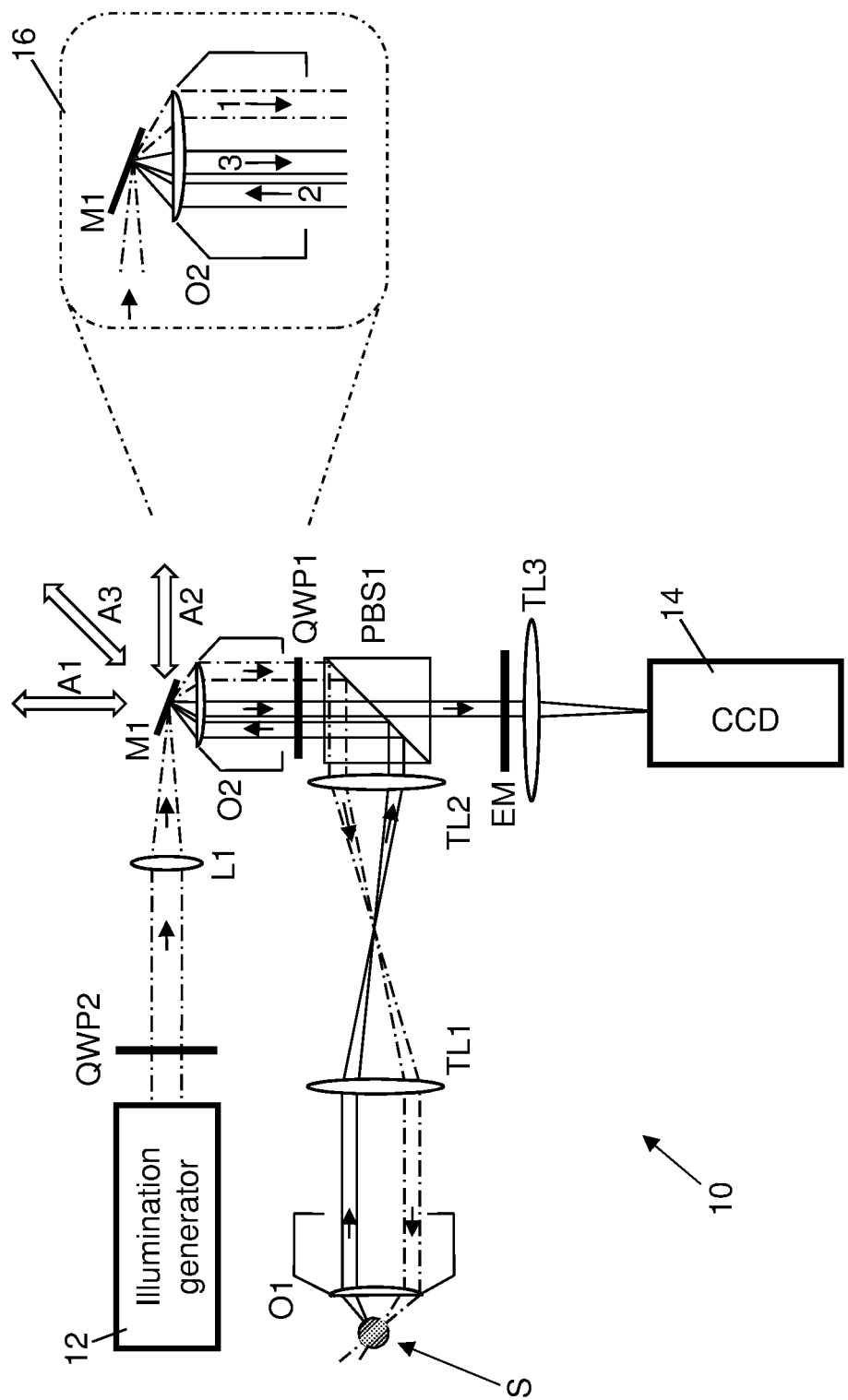
FIG. 2 illustrates a first embodiment of a new (so-called "folded") OPM setup according to the present invention.

A first embodiment of a "folded" OPM configuration, that provides a new beam scanning mechanism and enables a more compact beam path, is illustrated in FIG. 2.

In brief, in the new "folded" configuration, the light sheet illumination pattern (generated by illumination generator 12) is produced at mirror M1 (via lens L1) and is then relayed to the sample S via so-called "microscope 2" (objective lens O2 and relay lens TL2) and "microscope 1" (relay lens TL1 and objective lens O1). The illumination generator 12 may provide any number of light sheet illumination beams, e.g. Gaussian, scanned Bessel, Airy, or lattice light sheet.

Emitted light (fluorescence) from the sample S is then relayed back to mirror M1 via "microscope 1" (objective lens O1 and relay lens TL1) and "microscope 2" (relay lens TL2 and objective lens O2). The emitted light reflects off mirror M1 and is then collected back into objective lens O2 and relayed to form an image of a tilted plane in the sample on the camera 14 by a third microscope ("microscope 3") formed by objective lens O2 and relay lens TL3. A beam splitter is used to separate the beam paths to the microscope and the camera and may comprise a non-polarising or polarising beam splitter. The beam splitter PBS1 shown in FIG. 2 is a polarising beam splitter that, when combined with quarter-wave plate QWP1, increases the optical throughput compared to a non-polarising beam splitter.

In more detail, still with reference to FIG. 2, the presently-disclosed arrangement 10 for oblique plane microscopy comprises an illumination generator 12 arranged to provide a beam of illumination (e.g. laser light, illustrated using broken lines) through the first objective lens O1, to illuminate or excite an oblique plane (shaded in the figure) of the sample S in use. The first objective lens O1 is also arranged to receive a beam of emitted light (e.g. fluorescence, illustrated using solid lines) from the oblique plane of the sample S in use. As described in WO 2010/012980 A1, only a part of the available numerical aperture of the first objective lens O1 is used to image the sample S at an oblique angle, while another part of the first objective lens O1 is used to illuminate the sample S at a different angle.

First and second relay lenses TL1, TL2 and the second objective lens O2 are sequentially arranged to receive the beam of emitted light from the first objective lens O1.

As illustrated, the first objective lens O1 and the first relay lens TL1 form the first microscope (so-called "microscope 1") arranged to produce a magnified image of the oblique plane of the sample, and the second relay lens TL2 and the second objective lens O2 form the second microscope ("microscope 2") arranged to demagnify the magnified image and thereby form, at the focal plane of the second objective lens, an intermediate image having a tilted plane conjugate to that of the oblique plane of the sample. As those skilled in the art will appreciate, to achieve the optical relay effect, the second relay lens TL2 may be separated from the first relay lens TL1 by the sum of their focal distances.

The optical arrangement 10 further comprises the mirror M1 (also referred to as the "first" mirror herein) located at said focal plane of the second objective lens O2, arranged to receive and reflect the beam of emitted light; the third relay lens TL3; and the image detector 14. The intermediate image produced by microscope 2, having a tilted plane conjugate to that of the oblique plane of the sample, is formed in the plane of the first mirror M1.

The second objective lens O2 and the third relay lens TL3 form the third microscope ("microscope 3") arranged to relay the intermediate image from the first mirror M1 to the image detector 14. In the illustrated embodiment the image detector 14 is a charge-coupled device (CCD), although in other embodiments alternative image detectors or cameras may be used.

Significantly, the first mirror M1 is also arranged to receive the beam of illumination from the illumination generator 12 and to reflect the beam of illumination through the second objective lens O2.

The optical arrangement 10 further comprises a beam splitter (in this case, polarising beam splitter PBS1 together with quarter-wave plate QWP1) disposed between the second objective lens O2 and the second relay lens TL2, the beam splitter being configured to:
(i) direct the beam of illumination from the second objective lens O2 to the second relay lens TL2, and thence to the first relay lens TL1, the first objective lens O1 and the sample S;
(ii) direct the beam of emitted light from the second relay lens TL2 to the second objective lens O2, and thence to the first mirror M1; and
(iii) direct the reflected beam of emitted light from the second objective lens O2 to the third relay lens TL3 and thence to the image detector 14.

For the sake of clarity, the enlarged inset 16 in FIG. 2 (and in some of the subsequent figures) shows that the beams passing through the second objective lens O2 are, in sequence, as follows:

1. Illumination from the illumination generator 12, after having been reflected by the first mirror M1, before passing through the beam splitter arrangement (QWP1, PBS1).
2. Emitted light from the sample S, after having passed through the first objective lens O1, the relay lenses TL1 and TL2, and the beam splitter arrangement (PBS1, QWP1), before being reflected by the first mirror M1.
3. The emitted light from the sample, after having been reflected by the first mirror M1, before it passes back through the beam splitter arrangement (QWP1, PBS1) and ultimately reaches the image detector 14.

Ideally, the second objective lens O2 has a high numerical aperture, i.e. a numerical aperture that is sufficiently high such that it does not restrict or reduce the numerical aperture of the first and second microscopes, and accommodates the arrangement of rays 1, 2 and 3 as shown in the enlarged inset 16 in FIG. 2. More particularly, as illustrated, the extent of the numerical aperture of O2 needs to encompass ray 1 to one side and ray 2 to the other side (with ray 3 being between the two).

As a consequence of the first mirror M1 being arranged to receive the beam of illumination from the illumination generator 12 and to reflect the beam of illumination through the second objective lens O2, as well as the first mirror M1 reflecting the emitted light from the sample S, and by virtue of the operation of the abovementioned beam splitter, this improves the optical performance of the OPM (as quantitatively evaluated below) and also makes the arrangement of the beam paths more compact.

Optical arrangements according to the present work may be used to image static samples, or may be employed to image particles or cells flowing through the oblique image plane, e.g. in a microfluidic device. Such particles or cells may be intentionally flowed through the oblique image plane, as part of the imaging procedure.

Image contrast may arise from fluorescent light excited at one or more wavelengths and detected in corresponding detection bands at longer (for single photon excitation) or shorter (for multiphoton excitation) wavelengths than each excitation wavelength. Alternatively, the image contrast may arise from differences in the fluorescence lifetime of the sample.

In practice, any one of the optical arrangements described herein may be integrated in a microscope, or provided as a "bolt-on" attachment for an existing microscope.

Evaluation of Improvements

To evaluate the improvements afforded by the present work, the pre-existing OPM setup (from WO 2010/012980 A1) was analysed using the following microscope objectives: O1, 60×/1.2 NA; O2, 50×/0.95 NA; O3, 40×/0.6 NA. The overall effective NA of this system is 0.7 and the collection efficiency (fraction of light collected over the range of angles subtended by a hemisphere) is 18.6% if the OPM angle (angle between the optical axis of microscopes 1&2 and microscope 3—see FIG. 3 of WO 2010/012980 A1) is 35°.

On the other hand, in the new "folded" OPM configuration of the present work, the specification of O2 and O3 become the same—as it is the same physical objective— and so therefore O3 is effectively formed by a 50×/0.95 NA microscope objective, i.e. the new configuration allows the numerical aperture of O3 to be greatly increased. There is a 50% loss in signal imposed by the use of the polarising beam splitter cube PBS1 but, despite this, the new folded configuration has an effective NA of 1.0 and a collection efficiency of 22.2%, so both parameters exceed those of the original OPM system. Therefore, the new folded OPM system is more compact and has improved spatial resolution compared to the pre-existing setup, and also provides an improved optical fluorescence collection efficiency.

Scanning Capability

Advantageously and conveniently, the new "folded" OPM configuration also enables the plane of imaging to be scanned rapidly through the sample by translating mirror M1, thereby enabling 3D imaging to be performed. Such scanning may be implemented using a suitable actuator coupled to the mirror M1. Such an actuator may be computer controlled, as those skilled in the art will appreciate. For the purpose of supporting the translated mirror M1 whilst minimising vibrations, the present work also provides a flexure stage design with a compensating mass, as described below with reference to FIG. 12.

The direction of motion of the remote scanning is defined by the angle of mirror M1 with respect to the optical axis of the second objective lens O2, so remote scanning can be achieved if mirror M1 is moved in any direction that has a component parallel to the mirror normal. Some possible directions of motion for mirror M1 are indicated by arrows A1, A2 and A3 in FIG. 2 and the subsequent figures. As illustrated, arrow A1 indicates movement of mirror M1 forwards or backwards along the optical axis of the second objective lens O2, arrow A2 indicates movement of mirror M1 forwards or backwards in a direction perpendicular to the optical axis of the second objective lens O2, and arrow A3 indicates movement of mirror M1 forwards and backwards in a direction parallel (or substantially parallel) to the normal of mirror M1.

In order to maximise the transmission of the illumination light through the system, the polarisation state of the illumination light should be adjusted to maximise its reflection from the beam splitter used. In the case of a polarising beam splitter as shown in FIG. 2, quarter-wave plate QWP2 can be inserted to provide the polarisation state with maximum throughput to the sample.

Figure 3:
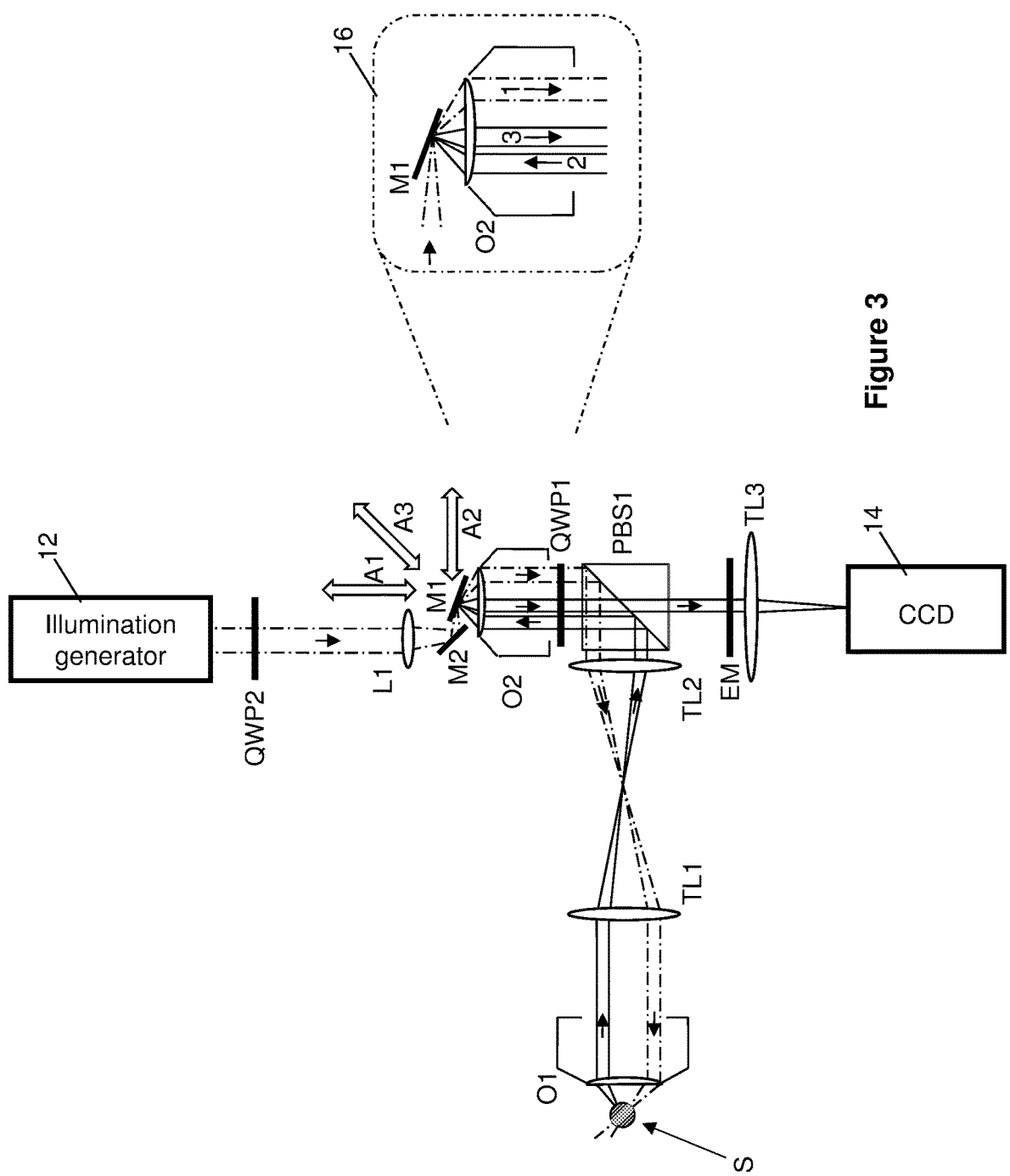
FIG. 3 shows a variant of the setup of FIG. 2, illustrating the use of a second mirror to increase the numerical aperture of the illumination beam in the case that it is restricted by the low working distance of the second objective lens.

As shown in FIG. 3, in the case that the working distance of the second objective lens O2 limits the achievable numerical aperture for the illumination beam, hence limiting the minimum sheet waist size, then a small stationary second mirror M2 can be incorporated close to the first mirror M1 and the second objective lens O2 to overcome this and avoid clipping of the illumination beam.

Beam Splitter Considerations

The beam splitter can be configured so that fluorescence emitted from the sample either reflects (as in FIG. 2) or transmits (as in FIG. 4) through the beam splitter on its path to mirror M1.

More particularly, in the configuration of FIG. 2, the fluorescence emitted from the sample is reflected by the polarising beam splitter PBS1 and then transmitted through the quarter-wave plate QWP1 before being focused by the second objective lens O2 onto the mirror 1. Then, the reflected fluorescence from the mirror M1 passes back through the second objective lens O2 and the quarter-wave plate QWP1 and is transmitted through the polarising beam splitter PBS1 towards the detector 14.

Figure 4:
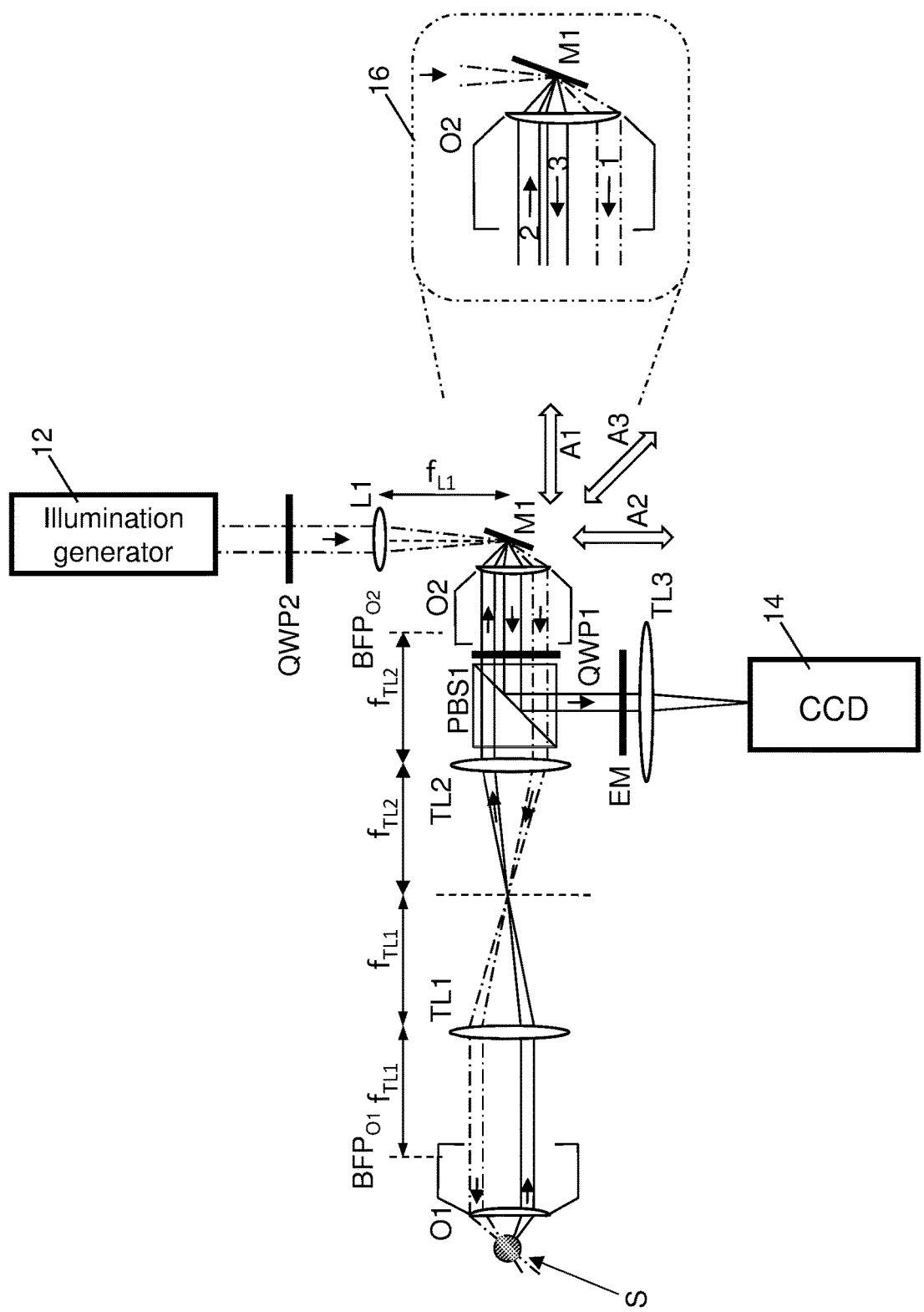
FIG. 4 illustrates a variant of the setup of FIG. 2, with the beam splitter orientated in transmission (rather than reflection as shown in FIG. 2) for the first pass of the emitted (fluorescence) signal.

On the other hand, in the configuration of FIG. 4, the fluorescence emitted from the sample is transmitted through the polarising beam splitter PBS1 and the quarter-wave plate QWP1 before being focused by the second objective lens O2 onto the mirror 1. Then, the reflected fluorescence from the mirror M1 passes back through the second objective lens O2 and the quarter-wave plate QWP1 and is then reflected by the polarising beam splitter PBS1 towards the detector 14.

Alternatively, PBS1 in FIG. 4 may be rotated by 90° about the optical axis of O1, TL1, TL2 and O2 such that the beam reflected by PBS1 is emitted vertically into (or out of) the plane of the figure.

In the case of isotropically distributed fluorophore dipoles, the configuration shown in FIG. 2, or a configuration as shown in FIG. 4 where the PBS is rotated by about the optical axis of O1, TL1, TL2 and O2, will lead to a higher fluorescence collection efficiency due to fluorescence anisotropy effects [4].

Rotational Variants

The angle of the oblique plane of imaging with respect to the plane of the page can be rotated by rotating mirror M1 about the optical axis of the second objective lens O2. This can be achieved for example by means of the configuration shown in FIG. 5, which includes a rotatable optical subassembly 18 (the dashed box). The rotatable optical subassembly 18 includes mirror M1, and also further mirrors M2, M3 and M4, and lens L1. The components of the rotatable optical subassembly 18 may be mounted on a common rotatable stage. Such an arrangement enables a set of images or image volumes to be acquired from the sample with different light sheet angles that can then be fused together in software, e.g. to produce a more isotropic system point spread function.

Figure 5:
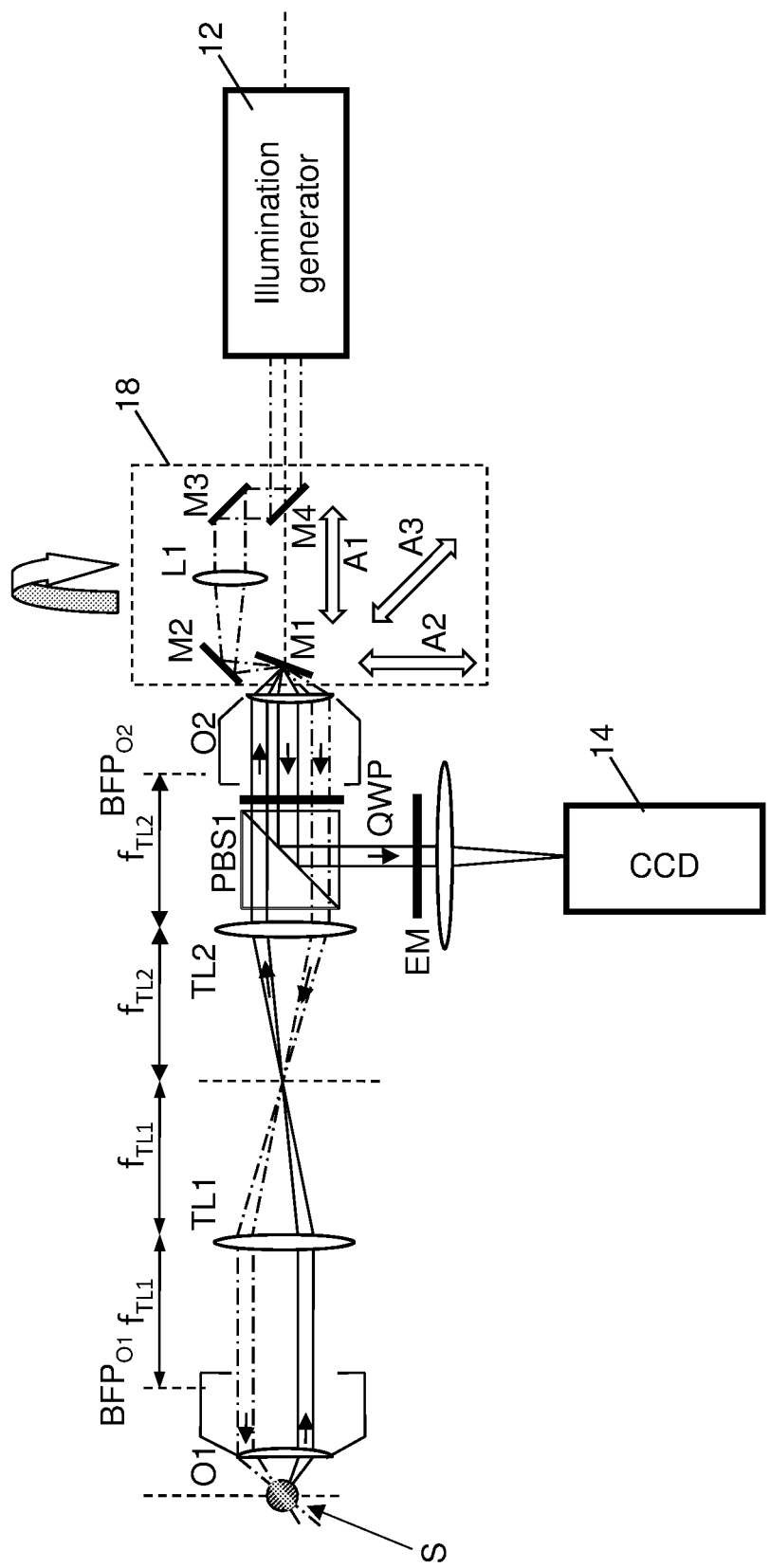
FIG. 5 shows a variant of the setup of FIG. 4, to illustrate that rotation of the optics shown in the dashed box allows the illumination and imaging plane to be rotated about the optical axis.
Figure 6:
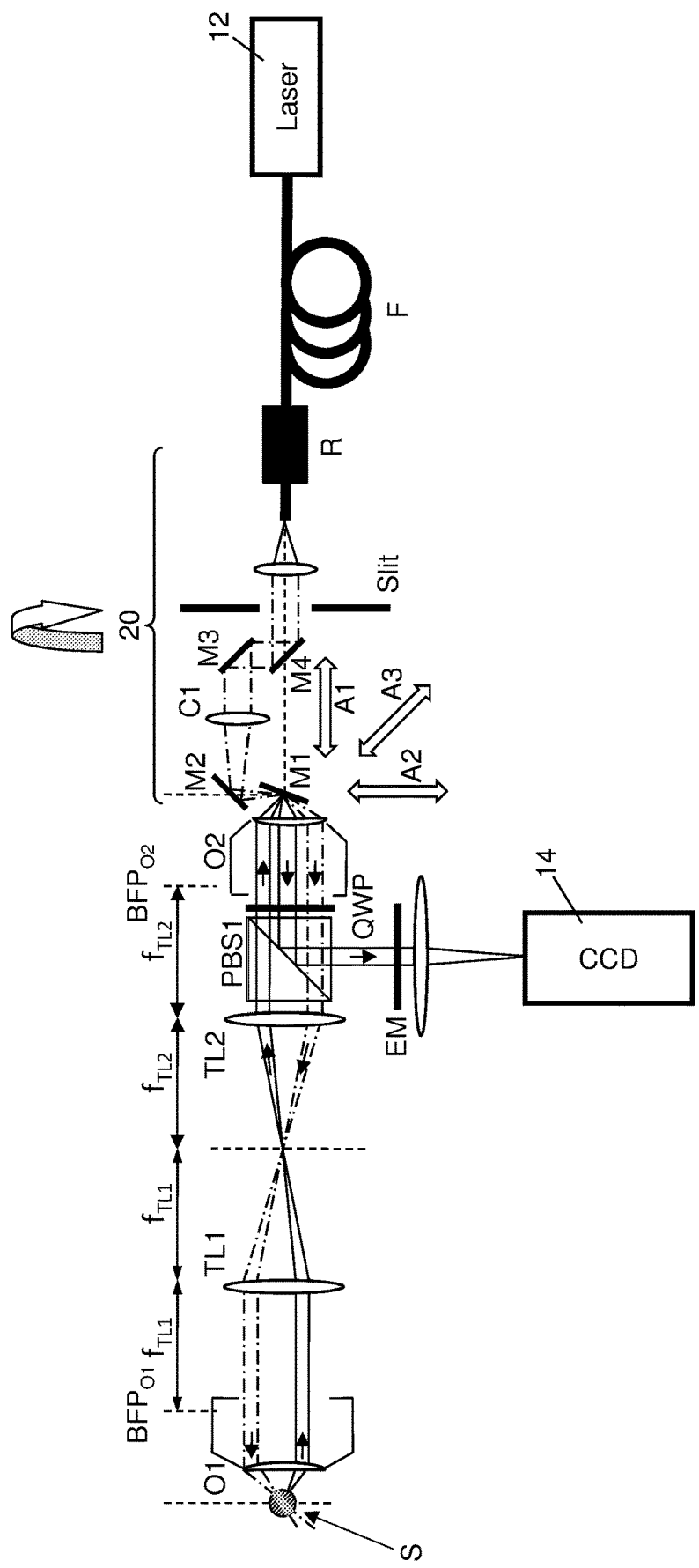
FIG. 6 illustrates a variant of the setup of FIG. 5, including a configuration for rotating the oblique plane in the case that the illumination beam is delivered via an optical fibre.

FIG. 6 illustrates a variant of the setup of FIG. 5, and shows that, if the illumination light is delivered via an optical fibre F, then an optical fibre rotating coupler R can be used to allow the mirror M1 and illumination optics (including mirrors M2, M3 and M4, and cylindrical lens C1) to be rotated without undesirable twisting of the optical fibre F. This advantageously enables the angle of illumination and detection to be changed with respect to the optical axis. The rotating fibre optic coupler R could for instance consist of two plane polished fibre ends placed in close proximity with the intermediate gap filled by a refractive index matching fluid. The collimation and illumination sheet generation optics (within the brace 20 in FIG. 6), including cylindrical lens C1, are then all rotated together.

Other well-known types of illumination optics to produce Gaussian, Bessel, Airy or other beam profiles can be used.

Selectable Illumination Beam Paths

Figure 7:
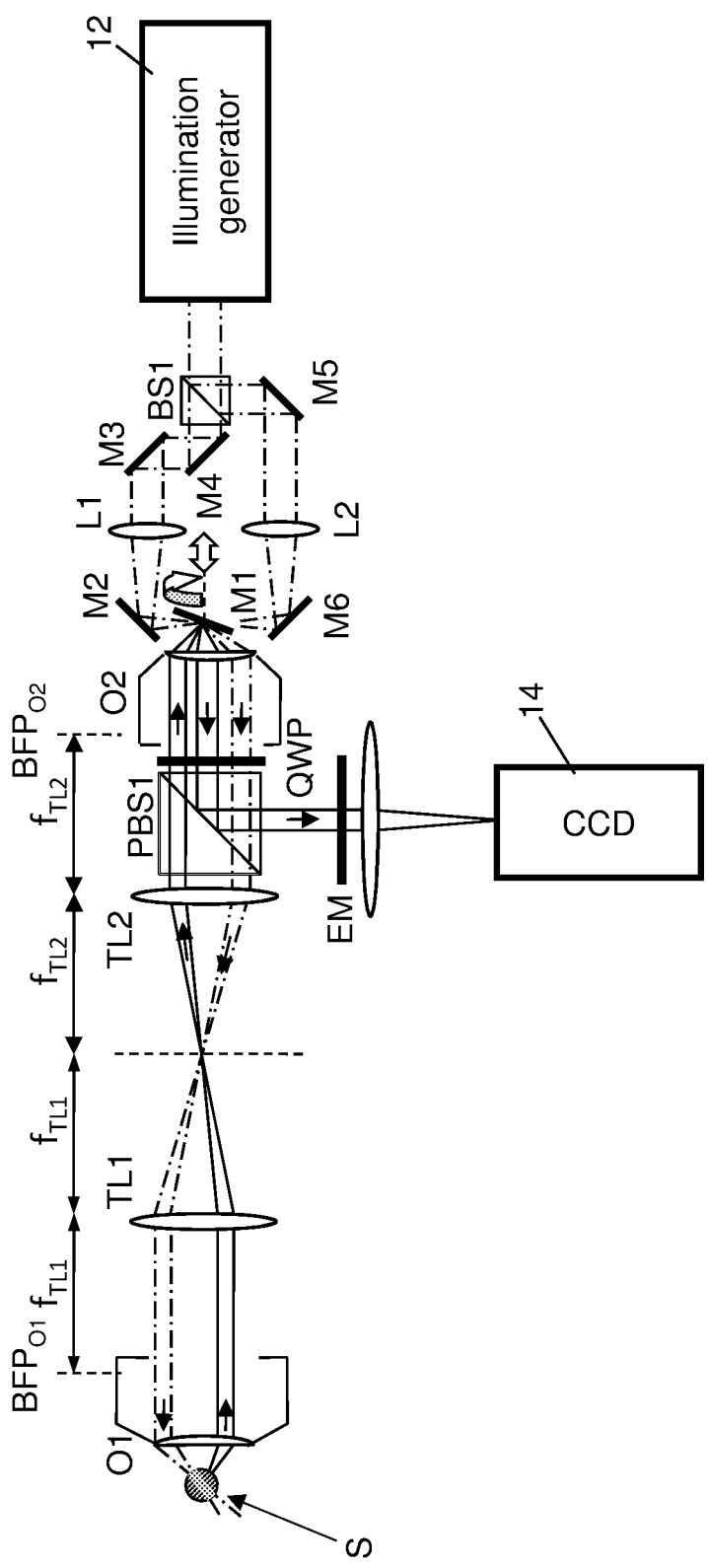
FIG. 7 illustrates an alternative configuration where the first mirror rotates to enable different illumination beam paths to be selected.

Alternatively, as illustrated in FIG. 7, two separate illumination beam paths—formed either by M4, M3, L1 and M2, or by M5, L2 and M6— can be used. The mirror M1 is rotatable to select one of the two illumination beam paths, i.e. via either M2 or M6. The axial position of the image plane can be controlled by the component of the translation of mirror M1 in the direction normal to the mirror M1, and one of the two illumination beam paths can be selected by rotating mirror M1 through 180° about the optical axis of the first and second microscopes.

By being able to change between the two illumination beam paths, images of the sample may be acquired from two different directions that can then be fused together in software to produce a near-isotropic spatial resolution. This is particularly important when performing quantitative analyses of cell morphology as non-isotropic resolution leads to many unwanted sources of bias.

Figure 8A:
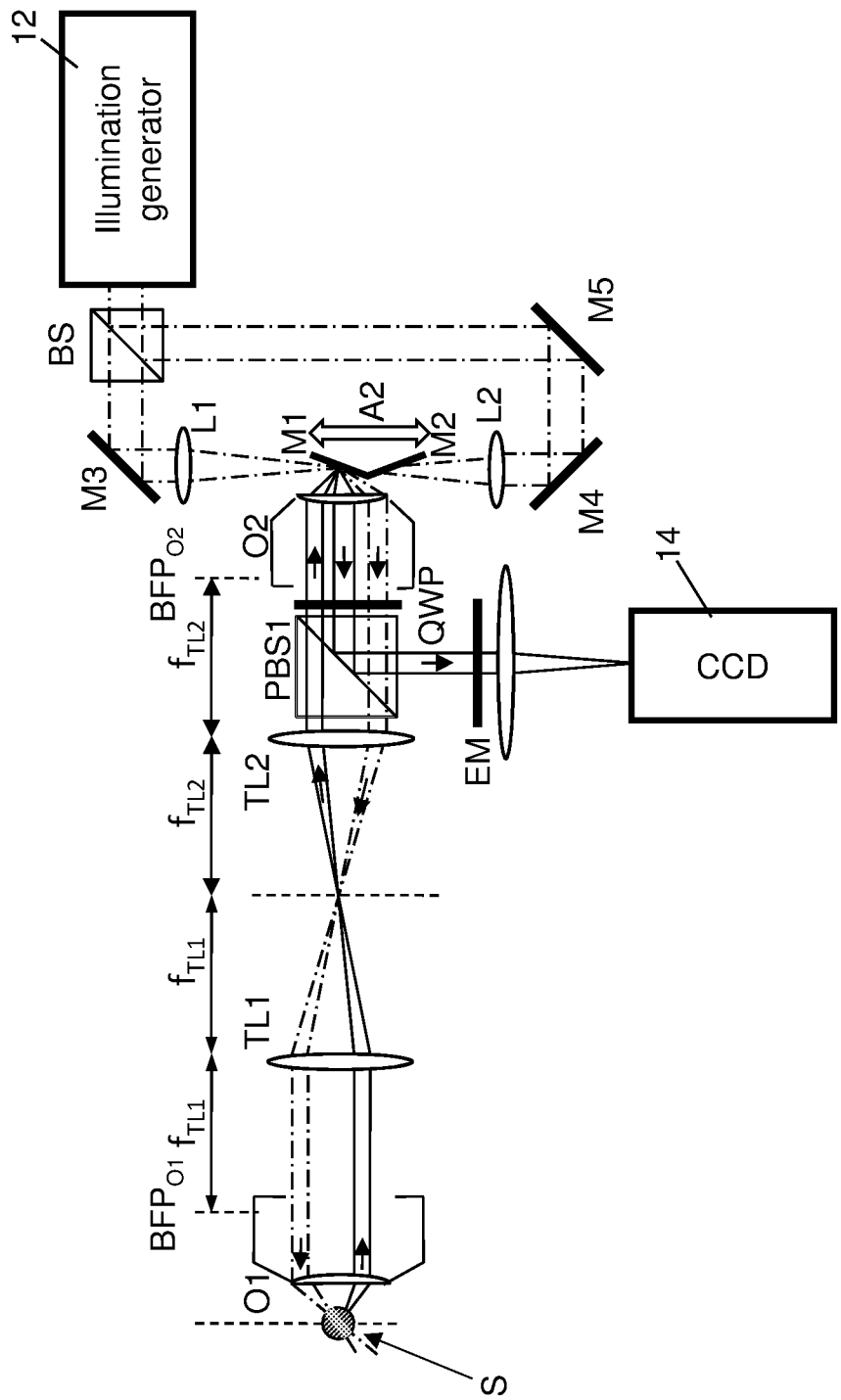
FIG. 8a illustrates an alternative configuration employing two mirrors at the focus of the second objective lens, to provide two different illumination and view angles.

Another alternative is that shown in FIG. 8a, where two small mirrors M1 and M2, orientated in different directions, can be translated perpendicular to the optical axis of the second objective lens O2 (i.e. forwards and backward in the direction of arrow A2), or with at least a component of their motion being perpendicular to the optical axis of the second objective lens O2. Fine translation of the mirrors M1 and M2 allows the height of the tilted illumination and image plane to be chosen, whereas coarse translation, to select the use of either M1 or M2 at the focus of the second objective lens O2, allows one of two different tilt angles to be chosen and to utilise illumination light from either L1 or L2 respectively.

The mirrors M1 and M2 could also be translated in multiple directions, with one actuation to switch between M1 and M2, and another direction to perform scanning while acquiring an image volume with one of the mirrors in use.

For ease of translation the mirrors M1 and M2 may be commonly mounted, e.g. on a translatable stage or other mount, thereby enabling them to be translated together, although in other embodiments they may not be commonly mounted.

Additional mirrors at different angles may be added to further increase the number of illumination/detection angles and volumes that can be imaged.

Figure 8B:
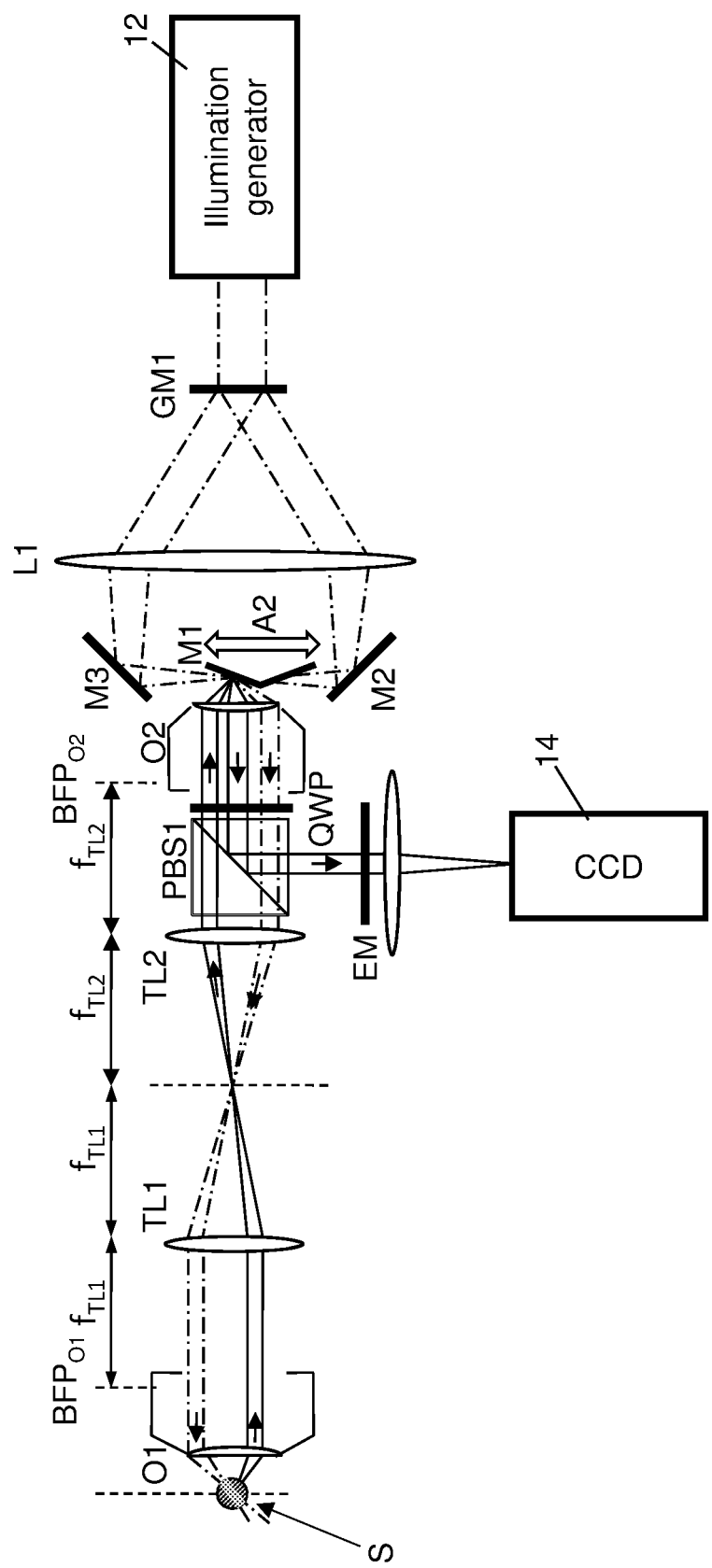
FIG. 8b illustrates a similar configuration to FIG. 8a but where the beams illuminating the said two mirrors originate from a common lens and a galvo mirror is used to direct the illumination light.

In an alternative embodiment shown in FIG. 8b, the mirrors M1 and M2 may be illuminated by a common lens L1 and the beam switched between the different beam paths by the use of a galvo mirror GM1.

Use of a Bulk Optical Circulator

Figure 9:
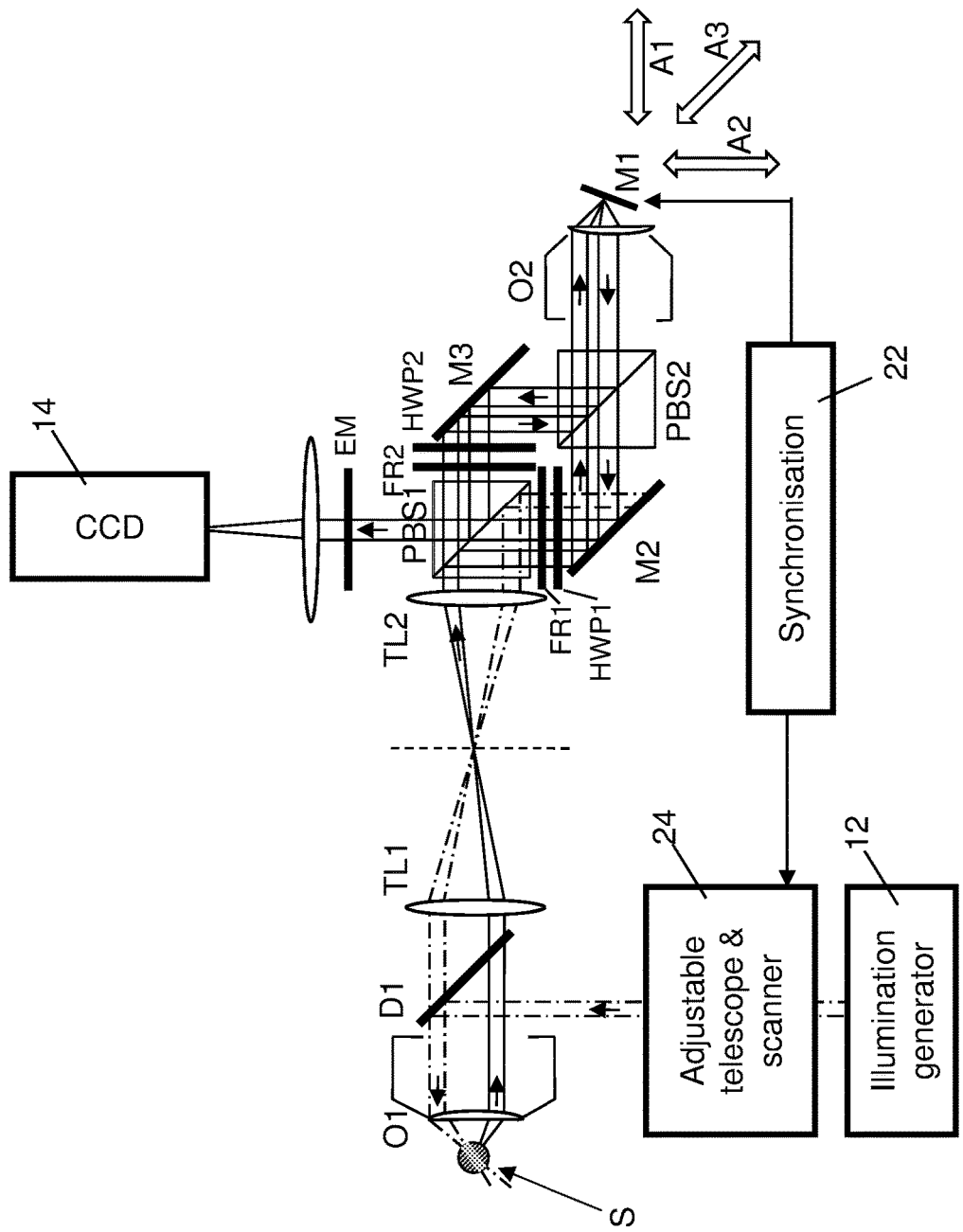
FIG. 9 illustrates the concept of including a bulk optical circulator configuration for increasing the optical collection efficiency.

In order to increase the optical collection efficiency of configurations where the emitted fluorescence double-passes the second objective lens O2, a bulk optical circulator configuration as illustrated in FIG. 9 can be employed, the bulk optical circulator configuration being formed by PBS1, PBS2, M2, M3, FR1, FR2, HWP1 and HWP2. FR1 and FR2 are Faraday rotators, which rotate the light differently depending on which direction the light is passing through. HWP1 and HWP2 are half-wave plates. In the configuration shown, a separate illumination beam path is provided via dichroic filter D1. The illumination generation optics are configured to provide axial scanning of a tilted light sheet and to match the scanning of the tilted plane in the emission path provided by translation of M1.

Preferably, the illumination optics provide the ability to tilt the angle of the illumination light sheet to match the image plane tilt angle determined by the angle of mirror M1, to translate the illumination light sheet perpendicular to the plane of the light sheet, and also for the axial position of the illumination beam waist to be translated so as to follow the centre of the field of view of the region imaged by the detection beam path as mirror M1 is translated.

To achieve the above, a synchronisation controller 22 may be provided, controllably coupled to an adjustable telescope and scanner 24 (within the illumination path from the illumination generator 12) and to an actuator provided for translating mirror M1, to control the scanning of the illumination light sheet and to synchronise it with translation of the mirror M1. The synchronisation controller 22 may be provided by a suitably programmed computer.

Figure 10:
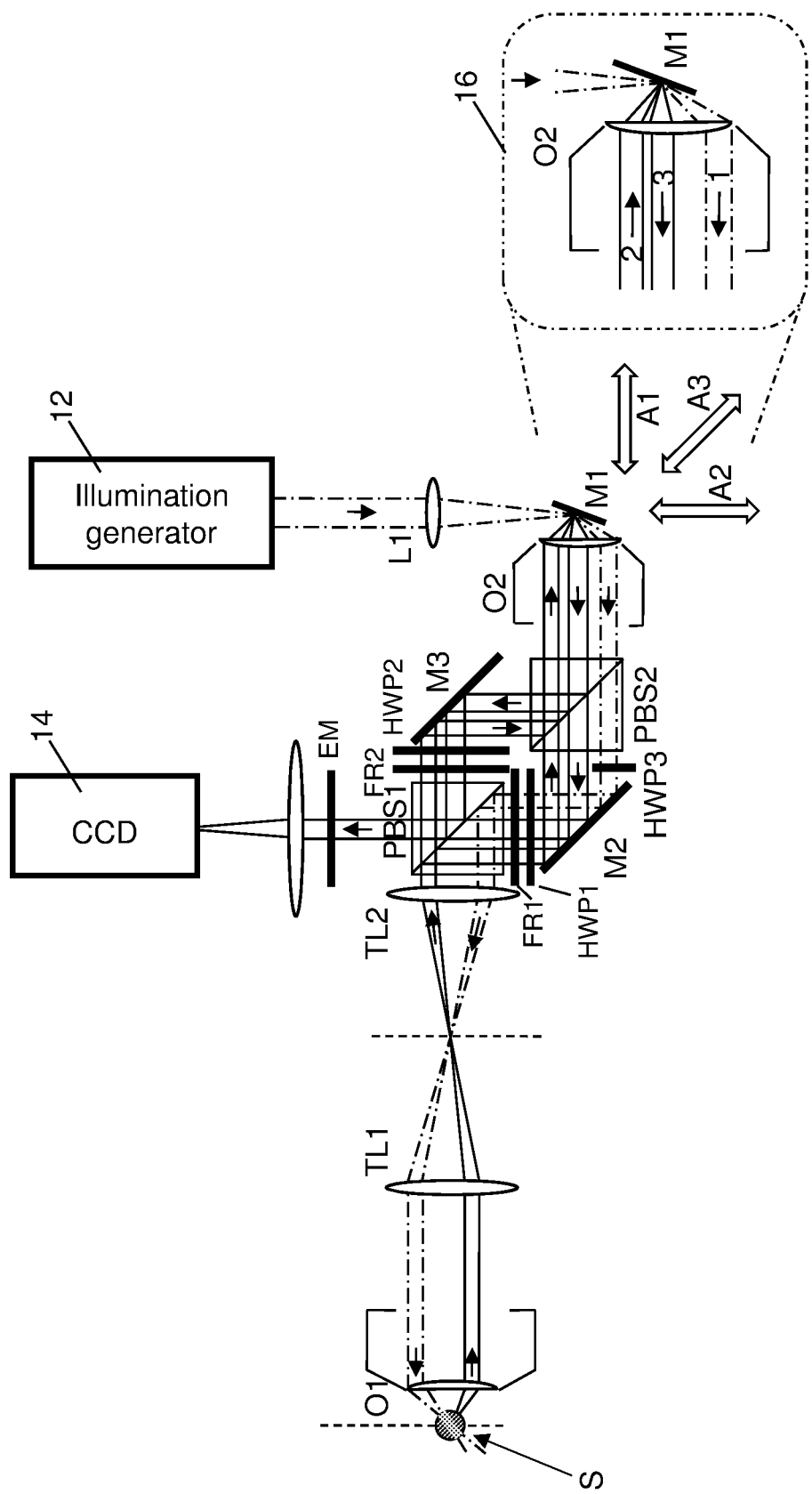
FIG. 10 illustrates a system including an optical circulator (as in FIG. 9) for efficient collection of the fluorescence signal, where the illumination beam is coupled in via a mirror (in a similar manner to the embodiments of FIGS. 2 to 8b)

As illustrated in FIG. 10, the principle of using a bulk optical circulator can be applied to a system in which the excitation light is coupled in via mirror M1, in the manner of the embodiments of FIGS. 2 to 8b. In this case, the optical circulator needs to be modified to allow additional polarization optics (half-wave plate HWP3 in the configuration shown in FIG. 10) to be placed so as to only act on the illumination beam, in order to allow the excitation light to be efficiently coupled to the sample.

Figure 11:
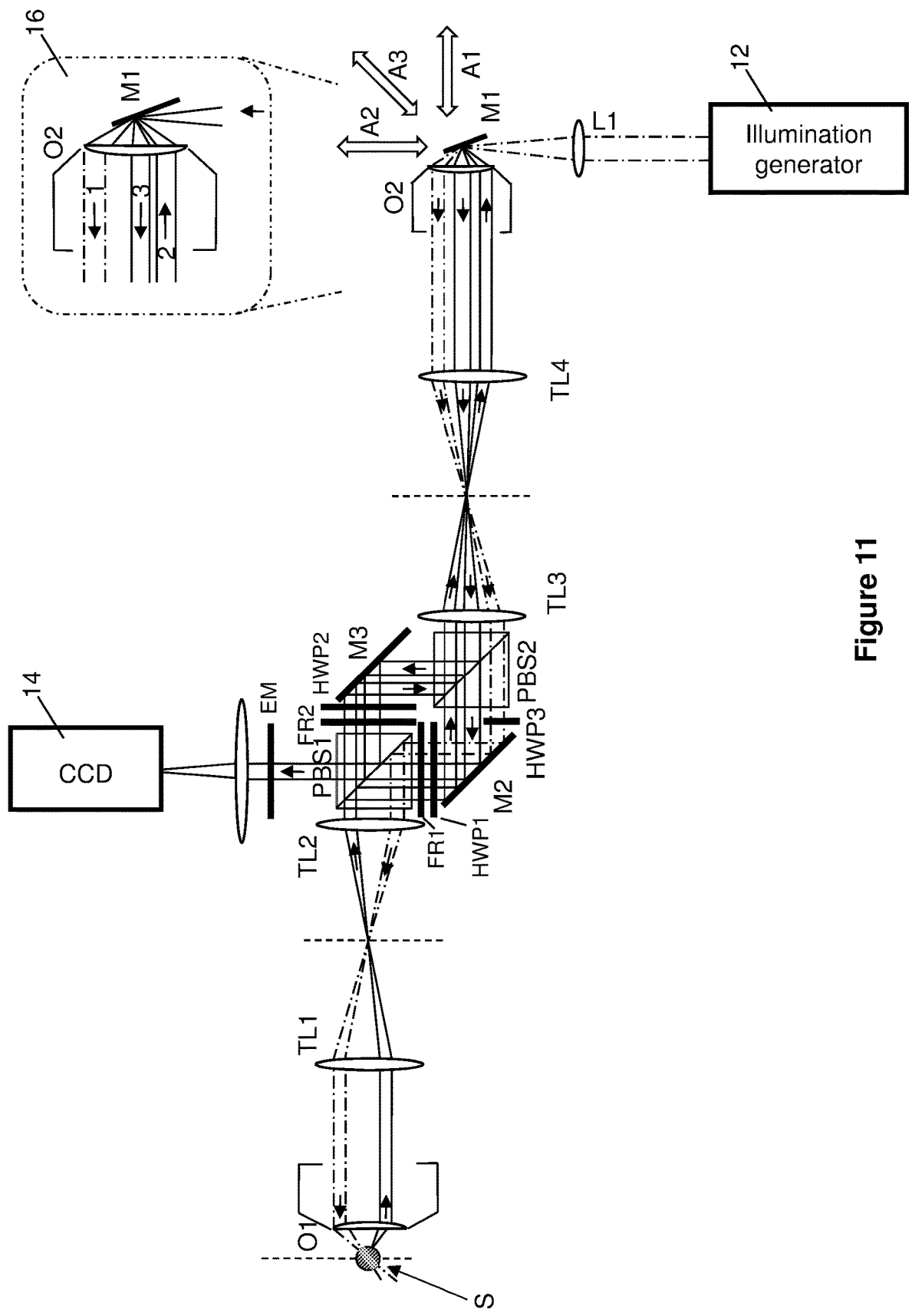
FIG. 11 illustrates a variant of the system shown in FIG. 10.

The optical system shown in FIG. 10 places HWP3 in a position where it preferably only interacts with the excitation light and not the detected fluorescence. Positioning HWP3 to achieve this may be easier if HWP3 is positioned so that it is conjugate to the pupil of O2. As shown in FIG. 11, this can be achieved by the addition of an extra pair of relay lenses, TL3 and TL4.

Flexure Stage with Compensating Mass

In order to translate the mirror M1 at the focus of the second objective lens O2, ideally a method for rapidly and accurately translating the mirror is required. However, left unchecked, rapid translation of the mirror may produce mechanical vibrations that may affect other parts of the optical setup. Such mechanical vibrations can be avoided or at least mitigated by coupling the translated mirror to a compensating mass having the same mass as the translated mirror, that oscillates in exactly the opposite direction (i.e. in antiphase) and with the same amplitude as the mirror.

Figure 12:
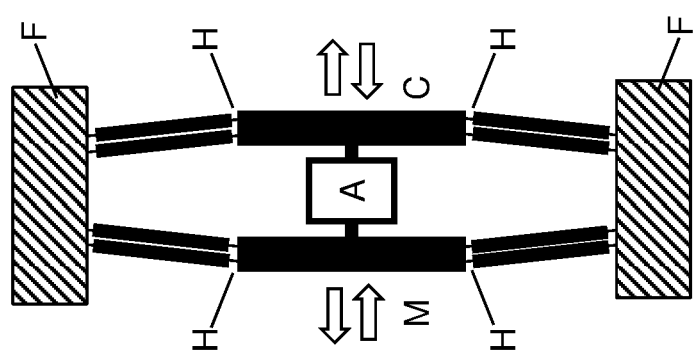
FIG. 12 is a plan view of a flexure stage design with a translated mirror and a compensating mass.

One possible setup for achieving this is shown in FIG. 12, which illustrates (in plan view) a flexure stage design having a compensating mass C so that the unit produces no vibration when the mirror M is translated. As mentioned above, the compensating mass C has the same mass as the translated mirror M. Both the mirror M and the compensating mass C are coupled to an actuator A that is disposed equidistantly between the mirror M and the compensating mass C, and which drives the mirror M and the compensating mass C so that they translate in antiphase with the same amplitude. Ideally, the line between the centre of mass of the mirror M and the centre of mass of the compensating mass C is parallel with their direction of motion. Translational motion of the mirror M and the compensating mass C is enabled by virtue of flexible hinges H. As illustrated, the flexible hinges H are located either side of the mirror M and either side of the compensating mass C, coupling the mirror M and the compensating mass C to opposing frame members F.

It should be noted that the principles illustrated in FIG. 12 may also be applied to other techniques in which a scanning mirror is used, such as other areas of microscopy, or spectrometry, as those skilled in the art will appreciate.

Photoactivation and/or Photoconversion

Figure 13:
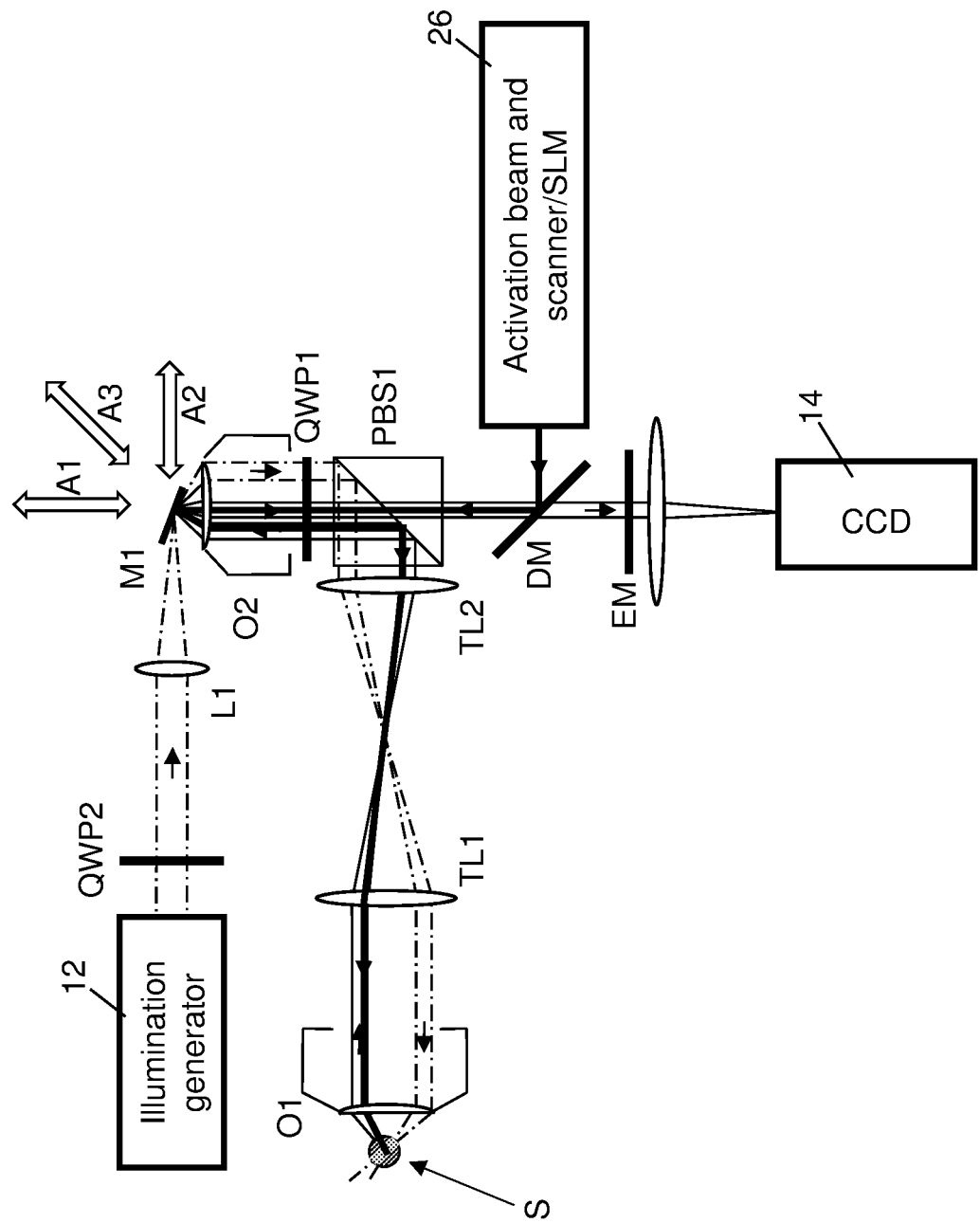
FIG. 13 illustrates an optical configuration for oblique plane microscopy that incorporates a method for photoactivation and/or photoconversion of the sample in a tilted plane.

In some biological experiments it is desirable to photoactivate and/or photoconvert a specific portion of the sample, e.g. only specific cells. FIG. 13 shows the incorporation of an additional activation beam (illustrated using a thick line) provided by a scanner or spatial light modulator (SLM) 26 via dichroic beam splitter DM. It can be seen that the activation beam is delivered to the sample S along much of the beam path taken by the emitted light from the sample, but in the reverse direction. More particularly, the activation beam passes through the second objective lens O2 and is reflected by the first mirror M1 back through the second objective lens O2 and thence along the path taken by the emitted light from the sample S to the second objective lens O2 in reverse.

This technique may be used for single or two-photon photoactivation or photoconversion of the sample. Because the activation beam passes through the second objective lens O2 and is reflected by the tilted mirror M1, changing the angle of the activation beam as it leaves the scanner 26 causes the activation beam to scan over a tilted plane in the sample. Activation from the activation beam scanner 26 could be combined with activation light from the light sheet illumination path in order to achieve two-photon (instantaneous or step-wise) photoactivation or photoconversion from orthogonal directions.

Figure 14:
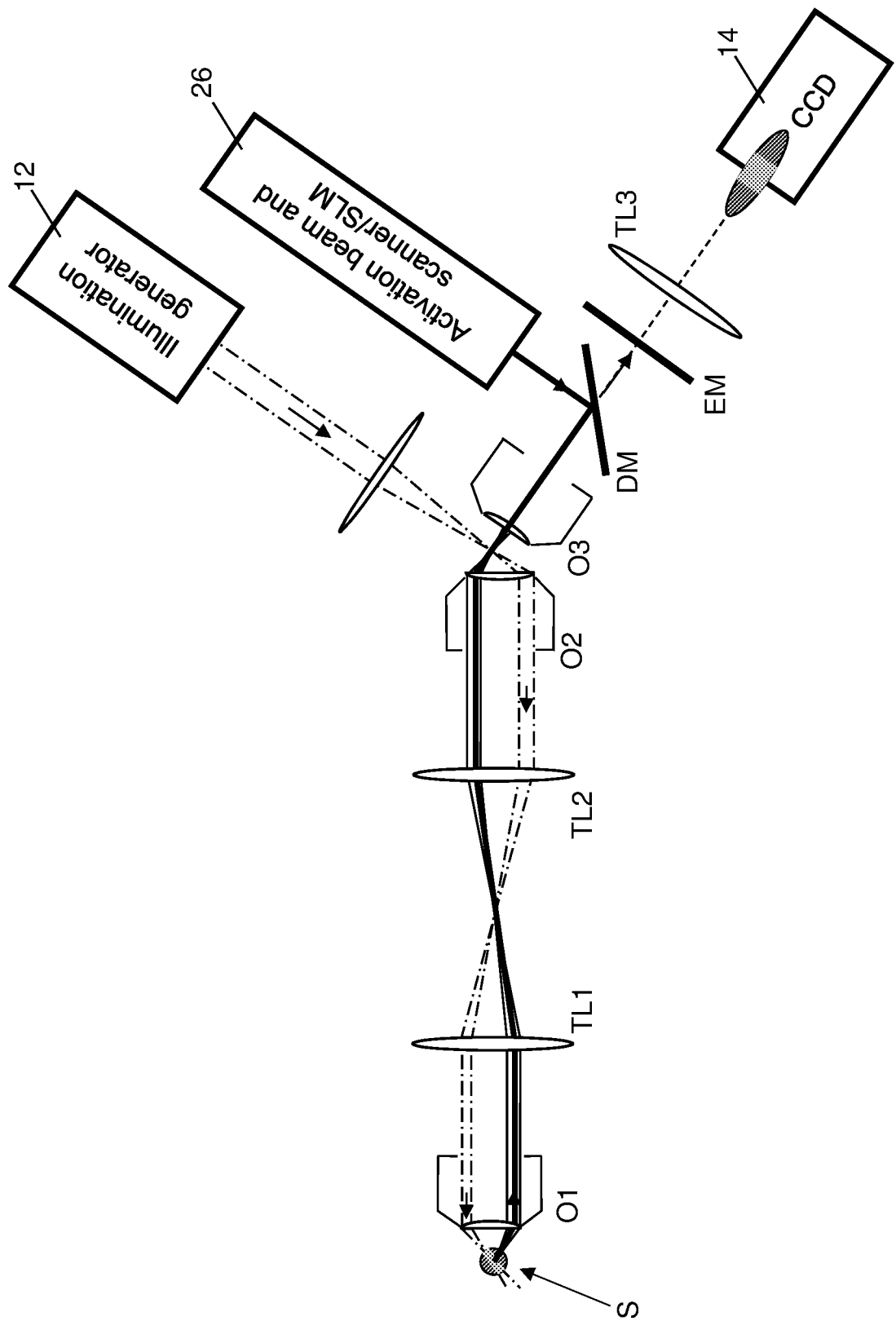
FIG. 14 illustrates the principles of FIG. 13 (incorporation of an activation beam to activate in a tilted plane in the sample) applied to a pre-existing OPM configuration (as per WO 2010/012980 A1).

As illustrated in FIG. 14, a similar approach can be incorporated in the non-folded original OPM configuration (as per WO 2010/012980 A1). Again, changing the angle of the activation beam scanner causes the activation spot to scan in a tilted plane in the sample that matches the tilted imaging plane. Again, the activation beam could be combined with light from the illumination beam to achieve two-photon (instantaneous or step-wise) photoactivation or photoconversion.

SUMMARY

As described above, the present work provides a device where an illumination light pattern is reflected off a mirror M1 and imaged to a sample S via an optical relay. Light from the sample S is then collected back through the same optical relay onto the mirror M1. Light from the sample S then reflects off the mirror and is collected by a subset of the same optical relay before being separated by a beam splitter onto an imaging detector.

Modifications and Alternatives

Detailed embodiments and some possible alternatives have been described above. As those skilled in the art will appreciate, a number of modifications and further alternatives can be made to the above embodiments whilst still benefiting from the inventions embodied therein. It will therefore be understood that the invention is not limited to the described embodiments and encompasses modifications apparent to those skilled in the art lying within the scope of the claims appended hereto.

For example, in the embodiments described above, the emitted light is primarily described as being fluorescence. However, in alternative embodiments, reflected or scattered light instead of fluorescence may be collected.

Moreover, in most of the embodiments described above, the optical relay between the first objective lens O1 and the mirror M1 comprises only the first and second relay lenses, TL1 and TL2. However, in alternative embodiments, additional relay lenses may be provided, for example between the first relay lens TL1 and the second relay lens TL2, if desired. It may also be possible that lenses O1 and O2 are designed so that they can be placed with just the beam splitter PBS1 in-between, without the need for any relay lenses.

Comments on WO 2010/012980 A1 with Respect to the Present Work

It should be noted that, in WO 2010/012980 A1, an embodiment was described with respect to FIG. 3 of that document, whereby a mirror is placed along the plane indicated by the line 44 in that figure, at the intermediate focal plane (coincident with image 36), so as to cause the detected image 47 to be produced via mirror 45 and lens 46. However, this in no way suggests that the illumination light may also be introduced via the same mirror (i.e. at the plane indicated by the line 44 in FIG. 3), thereby improving the optical performance of the OPM and making the arrangement of the beam paths more compact. Furthermore, WO 2010/012980 A1 also does not suggest that said mirror (at the plane indicated by the line 44 in FIG. 3) may be translated to implement scanning in OPM, to enable 3D imaging in an efficient and reliable manner that does not involve adjusting the axial position of any of the objective lenses.

Glossary of Abbreviations

For ease of reference, the components in the figures have been allocated the following abbreviations, that are also used in the above description:

BFP$_x$—back focal plane of lens x
BS—beam splitter
C—cylindrical lens
D—dichroic filter
DM—dichroic beam splitter
EM—emission filter
f$_x$—focal length of lens x
FR—Faraday rotator
GM—galvo mirror
HWP—half-wave plate
L—spherical lens
M—mirror
O—objective lens
PBS—polarising beam splitter
QWP—quarter-wave plate
TL—relay lens

REFERENCES

[1] C. Dunsby, Opt. Express, 16(25), pp. 20306, 2008
[2] S. Kumar, Opt. Express 19(15), pp. 13839, 2011
[3] M. B. Bouchard et al., Nat. Phot. 9, pp. 113-119, 2015
[4] J. Kim et al., Nature Methods 16, pp. 853-857, 2019

The invention claimed is:

1. An optical arrangement for oblique plane microscopy, comprising:
   an illumination generator arranged to provide a beam of illumination through a first objective lens to illuminate or excite an oblique plane of a sample in use, wherein the first objective lens is also arranged to receive a beam of emitted light from the oblique plane of the sample in use;
   first and second relay lenses and a second objective lens sequentially arranged to receive the beam of emitted light from the first objective lens and to form, at the focal plane of the second objective lens, an intermediate image having a tilted plane conjugate to that of the oblique plane of the sample;
   a first mirror located at said focal plane of the second objective lens, arranged to receive and reflect the beam of emitted light;
   a third relay lens; and
   an image detector;
   wherein the second objective lens and the third relay lens are arranged to relay the intermediate image from the first mirror to the image detector;
   wherein the first mirror is also arranged to receive the beam of illumination from the illumination generator and to reflect the beam of illumination through the second objective lens; and
   wherein the optical arrangement further comprises a beam splitter disposed between the second objective lens and the second relay lens, the beam splitter being configured to:
   (i) direct the beam of illumination from the second objective lens to the second relay lens, and thence to the first relay lens, the first objective lens and the sample;
   (ii) direct the beam of emitted light from the second relay lens to the second objective lens, and thence to the first mirror; and
   (iii) direct the reflected beam of emitted light from the second objective lens to the third relay lens and thence to the image detector.

2. The optical arrangement according to claim 1, wherein the first mirror is a translatable mirror, operable to cause the plane of imaging to be scanned through the sample in use.

3. The optical arrangement according to claim 2, wherein the first mirror is one of two mirrors orientated in different directions, the said two mirrors being translatable with at least a component of their motion being perpendicular to the optical axis of the second objective lens.

4. The optical arrangement according to claim 3, wherein said two mirrors are commonly mounted.

5. The optical arrangement according to claim 2, wherein the first mirror is coupled to a compensating mass, the compensating mass having the same mass as the first mirror, and arranged to oscillate in antiphase with the first mirror and with the same amplitude as the first mirror.

6. The optical arrangement according to claim 5, wherein the first mirror and compensating mass form part of a flexure stage, the flexure stage also having an actuator operable to drive the first mirror and the compensating mass.

7. The optical arrangement according to claim 1, wherein the beam splitter comprises a polarising beam splitter together with a quarter-wave plate; or
   wherein the beam splitter comprises a non-polarising beam splitter.

8. The optical arrangement according to claim 1, further comprising a second mirror in the illumination beam path, closely before the first mirror, for increasing the achievable numerical aperture of the illumination beam and hence decreasing the illumination sheet waist size in use.

9. The optical arrangement according to claim 1, wherein the beam splitter is configured such that the beam of emitted light is reflected through the beam splitter on its path to the first mirror.

10. The optical arrangement according to claim 1, wherein the beam splitter is configured such that the beam of emitted light is transmitted through the beam splitter on its path to the first mirror.

11. The optical arrangement according to claim 1, wherein the first mirror is rotatable about the optical axis of the second objective lens.

12. The optical arrangement according to claim 11, further comprising a rotatable optical subassembly which includes the first mirror;
   wherein the components of the rotatable optical subassembly are mounted on a common rotatable stage.

13. The optical arrangement according to claim 11, wherein the illumination is provided by the illumination generator via an optical fiber;
   wherein the optical arrangement further comprises a rotating fiber optic coupler disposed between the optical fire fiber and the first mirror.

14. The optical arrangement according to claim 11, wherein the first mirror is rotatable to enable the selection of one of two illumination beam paths.

15. The optical arrangement according to claim 1, further comprising a bulk optical circulator.

16. The optical arrangement according to claim 1, further comprising a device for generating an activation beam to cause photoactivation and/or photoconversion in a portion of the sample;
   wherein the activation beam is arranged to pass through the second objective lens and be reflected by the first mirror back through the second objective lens and thence along the path taken by the emitted light from the sample to the second objective lens in reverse.

17. A method of performing oblique plane microscopy comprising:
   providing a beam of illumination through a first objective lens to illuminate or excite an oblique plane of a sample, wherein the first objective lens is also arranged to receive a beam of emitted light from the oblique plane of the sample;
   sequentially using first and second relay lenses and a second objective lens to receive the beam of emitted light from the first objective lens and to form, at the focal plane of the second objective lens, an intermediate image having a tilted plane conjugate to that of the oblique plane of the sample;
   using a first mirror located at said focal plane of the second objective lens to receive and reflect the beam of emitted light; and
   relaying the intermediate image from the first mirror to the image detector using the second objective lens and a third relay lens;
   wherein the first mirror also receives the beam of illumination from the illumination generator and reflects the beam of illumination through the second objective lens; and
   wherein the method further comprises using a beam splitter disposed between the second objective lens and the second relay lens to:
   (i) direct the beam of illumination from the second objective lens to the second relay lens, and thence to the first relay lens, the first objective lens and the sample;
   (ii) direct the beam of emitted light from the second relay lens to the second objective lens, and thence to the first mirror; and
   (iii) direct the reflected beam of emitted light from the second objective lens to the third relay lens and thence to the image detector.

18. The method according to claim 17, further comprising translating the first mirror to cause the plane of imaging to be scanned through the sample.

19. The method according to claim 18, further comprising coupling the first mirror to a compensating mass, the compensating mass having the same mass as the first mirror, and arranged to oscillate in antiphase with the first mirror and with the same amplitude as the first mirror.

20. The method according to claim 18, further comprising generating an activation beam to cause photoactivation and/or photoconversion in a portion of the sample;
   wherein the activation beam passes through the second objective lens and is reflected by the first mirror back through the second objective lens and thence along the path taken by the emitted light from the sample to the second objective lens in reverse.

21. The method according to claim 17, wherein the first mirror is one of two mirrors orientated in different directions, and the method further comprises translating said two mirrors with at least a component of their motion being perpendicular to the optical axis of the second objective lens.

* * * * *